United States Patent [19]

d'Alayer de Costemore d'Arc

[11] Patent Number: 5,228,014
[45] Date of Patent: Jul. 13, 1993

[54] PROCESS AND APPARATUS FOR AUTOMATICALLY MEMORIZING REFERENCES OF RECORDINGS CARRIED ON A RECORDING MEDIUM

[75] Inventor: Stephane M. d'Alayer de Costemore d'Arc, Genappe, Belgium

[73] Assignee: Staar S.A., Brussels, Belgium

[21] Appl. No.: 851,778

[22] Filed: Mar. 16, 1992

[30] Foreign Application Priority Data

Mar. 20, 1991 [BE] Belgium ............... 9100259

[51] Int. Cl.$^5$ ............... G11B 17/22; G11B 7/00
[52] U.S. Cl. ................ 369/32; 369/33; 369/14; 360/72.2
[58] Field of Search ............... 369/32, 33, 47, 30, 369/14, 41, 44.36, 49, 34, 48, 50, 59, 178, 180, 233; 360/72.1, 72.2, 78, 69

[56] References Cited

U.S. PATENT DOCUMENTS

| | | | |
|---|---|---|---|
| 4,779,252 | 10/1988 | Custers et al. | 369/32 |
| 4,872,151 | 10/1989 | Smith | 369/14 |
| 5,063,547 | 11/1991 | Custers et al. | 369/32 |

FOREIGN PATENT DOCUMENTS

| | | |
|---|---|---|
| 346979 | 12/1989 | European Pat. Off. |
| 60-080168 | 5/1985 | Japan. |
| 2107106 | 4/1983 | United Kingdom. |

Primary Examiner—Steven Mottola
Assistant Examiner—Ali Neyzari
Attorney, Agent, or Firm—Leydig, Voit & Mayer

[57] ABSTRACT

Process for memorizing the references of recordings carried on a medium. The process is active in play mode in a device provided with means for recognizing a medium and automatically carries out the following steps for each recording carried on said medium: monitoring the continuity of reproduction, automatically memorizing the reference of said recording if it is played in its entirety or if a predetermined proportion of it is played.

7 Claims, 2 Drawing Sheets

PROCESS AND APPARATUS FOR AUTOMATICALLY MEMORIZING REFERENCES OF RECORDINGS CARRIED ON A RECORDING MEDIUM

TECHNICAL FIELD

The present invention relates to improvements in reproduction apparatuses for playing recordings carried on a recording medium (such as disc players, magnetic tape players, disc changers, cassettes etc.) and more particularly, to improved processes for automatically memorizing a particular sequence of the recordings played by such apparatuses.

BACKGROUND OF THE INVENTION

Heretofore, apparatuses for playing recordings have been equipped with a function known as a "memory" which, for any type of recording medium (disc, cassette, tape, etc.) placed in the operating position, enables the user to program and store in memory, at any given time, only those recordings which he wishes to reproduce at a later time, by entering a particular reference for each recording (order of occurrence on the medium, number in the index, etc.). In fact the large majority of media comprise several recordings, only some of which appeal to the user.

This "memory" function requires that each recording medium must have been previously identified by means of a signature, either automatically (medium identification number, total duration of recordings, number of recordings, etc.), or manually by the user introducing an appropriate reference (number, name of medium, etc.)

Once the "favorite" recordings of a particular recording medium have been memorized, each time when said medium is placed again in the operating position in the reproduction apparatus, said device recognizes the signature and automatically reproduces only those recordings whose references have previously been stored in memory by the user.

For example, compact disc players equipped with such a function are available on the consumer market under the brand names Philips (model CD624 - FTS system), Sony (model CDP-X55 - personalized memory system), etc.

However, it has been established that such a memory function is not frequently used, not because of lack of interest but because it requires a large number of operations which are very often abstract for the average user. It is well known that consumers give up using a function as soon as it involves a succession of operations, since they do not remember them and they are not disposed to look up the instruction manual every time.

Furthermore, if a user wishes to program the "favorite" recordings on a medium, he has to consult the contents list of said medium to obtain the references, otherwise it is not possible to correctly locate and memorize the references of these recordings, because the disc is in the operating position inside the reproduction apparatus. Moreover, for apparatuses mounted in vehicles, the user, who is generally the driver, for obvious safety reasons cannot carry out the multiple operations necessary, and this is the reason why apparatuses for vehicles have heretofore not been provided with such a "memory" function.

As a result, "programming" or "memory" functions for memorizing "favorite" recordings are not often used, despite the advantages they could bring.

SUMMARY OF THE INVENTION

The aim of the present invention is to remedy these various disadvantages by offering extremely simple, reliable and inexpensive means for carrying out such memorization of "favorite" recordings without requiring any special or unusual manipulation from the user of a standard device.

A second aim of the invention is to make maximum use of the existing controls of any standard device for playing recordings, in order, on one hand, to prevent an increase of the manufacturing cost and, on the other hand, to avoid the user having to carry out an in-depth study of the instructions or to manipulate extra buttons.

In order to achieve these aims, the process according to the invention includes:

a process for memorizing references of recordings carried on a medium placed in the operating position in a playback device, the playback device being provided with means for recognizing a medium, means for memorizing the references, and a control for operating the means for memorization, the process being active in play mode and automatically carrying out the following steps for each recording carried on a medium placed in the operating position:

monitoring the continuity of reproduction, automatically identifying the reference of the recording if it is played in its entirety or if a predetermined proportion of it is played, and storing for the medium all references automatically identified.

Various advantages and characteristics of the invention will be apparent from the following detailed, non-limitative description of a preferred embodiment, applied to a record player of the "compact disc" type.

DESCRIPTION OF THE PREFERRED EMBODIMENTS

Figure 1:
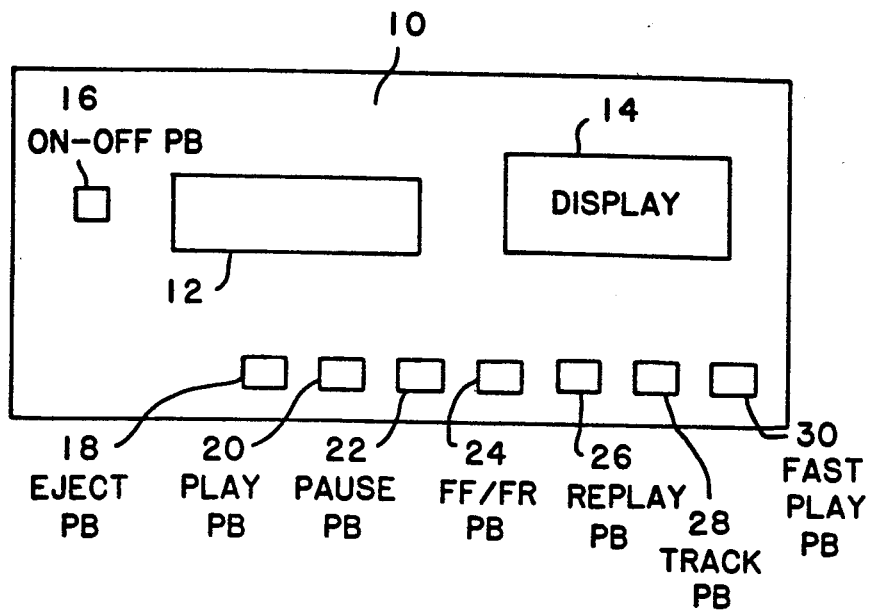
FIG. 1 is a schematic diagram of a standard disc player with its main controls.

As represented in FIG. 1, a standard disc player 10 has an aperture 12 for loading a disc to enable it to be played or to be removed after playing, a display device 14 providing the user with various information such as: playing time of the disc, number of the recording being played, function being carried out, etc., an ON-OFF button 16 together with a plurality of standard controls 18, 20, 22, 24, 26, 28, 30 enabling the user to switch the apparatus to the desired operating mode, including in particular: loading/ejection of the disc, play, pause, fast forward/rewind, replay, locate beginning or end of track, fast playback, etc.

In case of discs of the "compact disc" type, the recordings they carry and which are read by the player head consist of successive blocks of data containing not only the basic audio and/or video information but also various information relating to the medium: table of contents, total duration of recordings, duration of each recording, position of each recording, etc. and relating to individual recordings: numbering of the sequences—subdivisions—frames—timing—track code, etc.

For example, when playing an audio "compact disc", a player can display for the recording being played its sequence number in the table of contents, together with its duration, elapsed playing time and remaining time of said recording and/or disc, etc. For more detailed information on the coding and processing of the various information carried on discs of the "compact disc" type, one will advantageously refer to the International Standard publication "CEI-IEC-908", which defines and explains the standards for the "Compact disc digital-audio system".

The program and the circuits for implementing the process of this invention, when applied to a compact disc player, make use of some of this standard information, in particular the sequence number of each recording.

In a preferred embodiment, the fact that a recording is played normally is used as a criterion for deciding whether it is considered as "favorite" by the user; as a result, selection and memorization of the recordings are carried out entirely automatically by monitoring the reproduction of each of them. If one of them is interrupted by a user command causing a reproduction other than the one being played (for example the next one), the program employing the criterion decides that the user is not interested in that recording.

If on the other hand, while a recording is played none of the command buttons 16 to 30 is used other than e.g. pause, replay, or switching to another source of reproduction, the program decides that the recording is a "favorite" and automatically memorizes its reference (for example, the sequence number on the medium) obtained by decoding the blocks of reproduced information.

A similar result can be obtained by monitoring one or more standard items of information related to each recording (for example, reference, playing time, remaining time, etc.) and monitoring whether it has been played for a predetermined minimum percentage (for example 80%) of its total duration.

In accordance with the invention, therefore, the process automatically causes the memorization or not of the appropriate reference for a recording, depending on whether or not it has been played in its entirety or for a significant proportion of it.

Such process is particularly appropriate for application in apparatuses mounted in vehicles, since they do not require any special manipulation by the user.

It is also possible, for example on apparatuses for home use, to add a single, simple control button entitled "eliminate" which if actuated while a recording is played ensures that its reference is not memorized and simultaneously causes the playback of the next recording on the medium.

In the example of an embodiment described below, the first specified criterion described above is implemented in a compact disc player, trademark Philips, model CD624.

This model is equipped with the FTS (favorite track selection) system which, given sufficient programming on the part of the user, enables him to memorize his favorite recordings by entering their sequence numbers. Further information on the operation of this process, in particular to perceive the large number of manipulations required, can be found in the instruction booklet for said device.

The recording media are identified by a signature specific to this FTS system.

Figure 2:
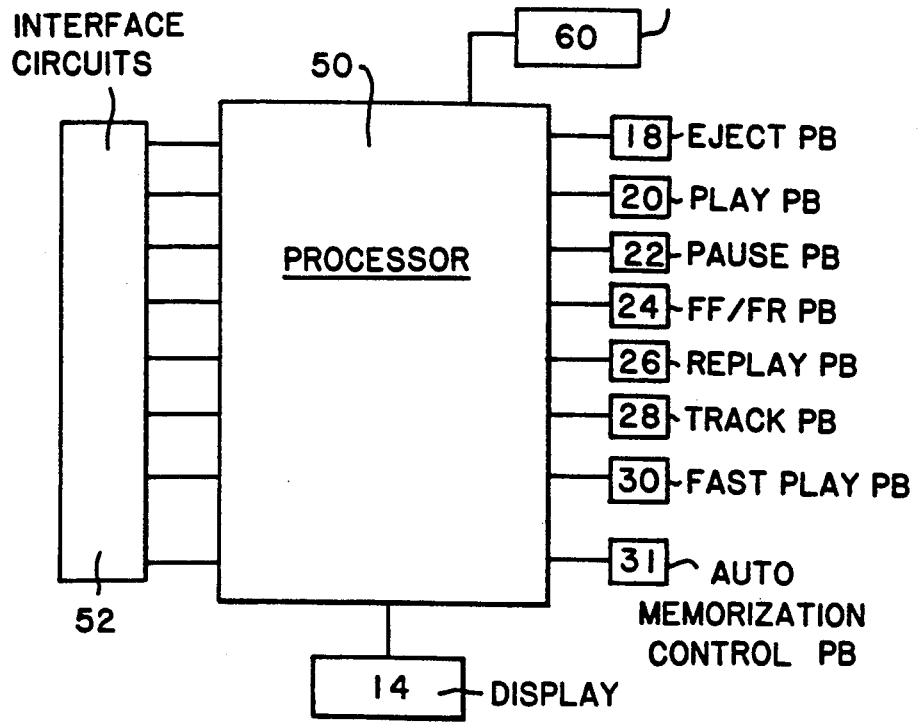
FIG. 2 is a schematic diagram of the electronic control circuit for a device such as represented in FIG. 1, incorporating the means for implementing a process, according to the invention.

The program implementing the preferred embodiment is a sequence of logical instructions which are preferably stored in memory in a central processor of the apparatus 10 diagrammatically illustrated in FIG. 2. To enable the automatic memorization system according to the invention to be activated or deactivated, a control actuated by a push-button 31 is provided. The apparatus also includes a central processor 50 and interface circuits 52 enabling the various parts of the device 10 to be operated and a memory 60 which, for each medium, enables the signature and references of favorite recordings to be memorized.

Figure 3:
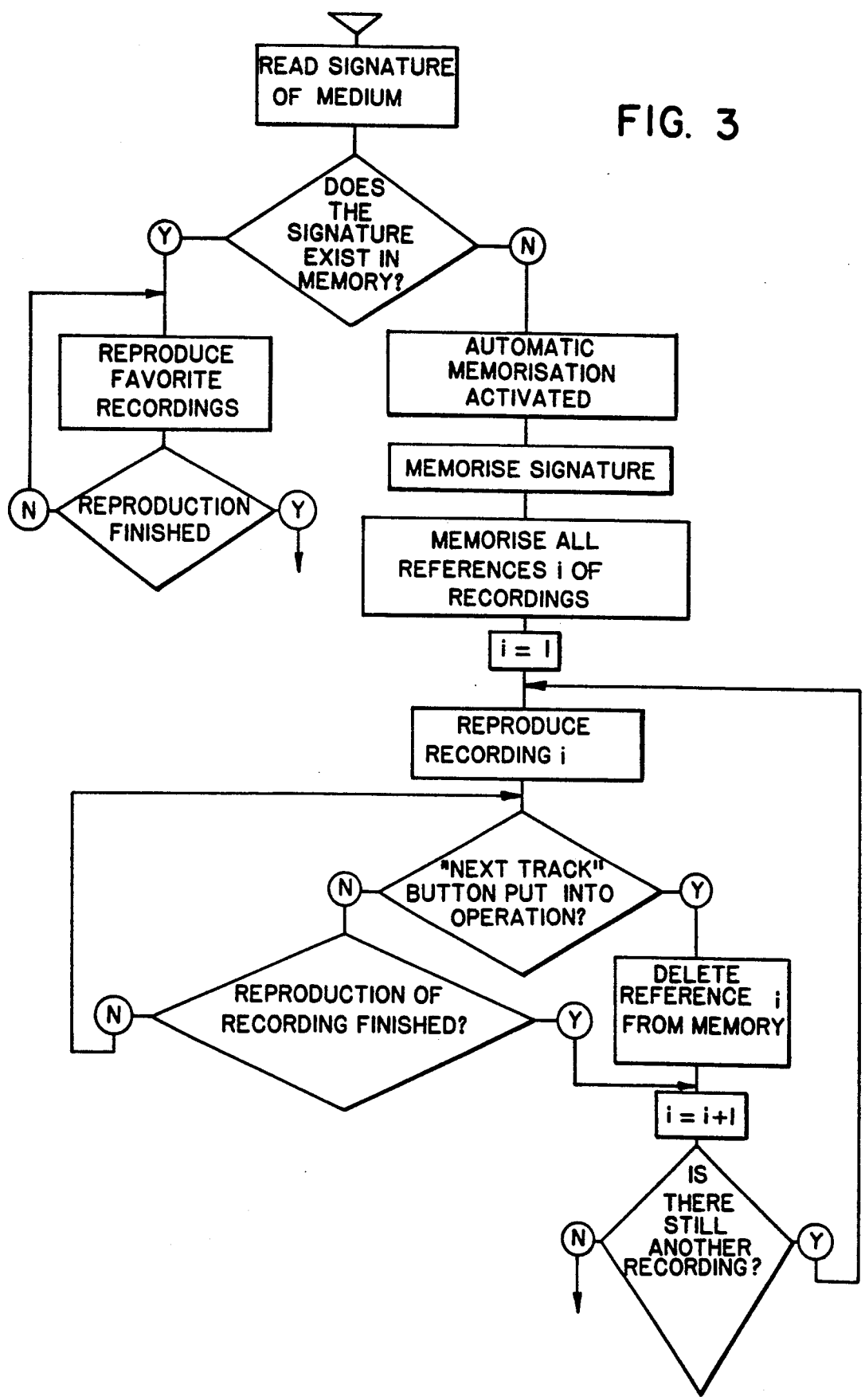
FIG. 3 is a flow chart of a program for implementing the process according to the invention.

As soon as a recording medium such as a disc is placed in the operating position in the apparatus 10, the information blocks on the disc are read and the processor 50 first (see FIG. 3) decodes the signature of the recording medium and compares it with those stored in memory 60 to see whether said recording medium is already known to the apparatus 10 and thus listed in memory 60.

If this is the case, it then looks in the section of memory 60 corresponding to the signature of said medium for the list of references (sequence number) of the favorite recordings of the user. The favorite recordings can be identified either by direct reading or by the complement of the recordings eliminated—a method of memorization often preferred when the number of recordings eliminated by the user is low compared with the number of recordings on the medium, in order to use only a limited amount of memory space for each medium and thus increase the number of signatures which can be memorized. If a list of favorite recordings is found then playback of these recordings only is carried out.

If the signature is not listed, i.e. the medium inserted is not known to the apparatus 10, the processor 50 implements the program of the invention, while storing in the memory 60 the signature of said medium and all the various references of the recordings on said medium.

While each recording (i) on said medium is played, processor 50 watches for the actuation of the button 31. When it is actuated, signifying that the process according to the invention has been activated , the processor 50 then watches for the actuation of controls 18 to 30, and in particular powering the playing of a recording other than the one which is playing.

If one of these buttons is actuated, the processor 50 ensures the positioning of the playing device at the beginning of the new recording selected, and does not memorize the reference of the recording which was being played. The fact that the user preferred to select another recording, rather than continue listening to the recording played to the end, means that he did not like it, so it is not necessary to memorize its reference for future playing.

If, on the other hand, while the recording is being played the processor 50 does not detect any operation of a control selecting another recording, the processor 50 concludes that this recording corresponds to the user's taste, and so its reference is kept in the appropriate part of memory 60.

Thus, for each recording medium, the process ensures the memorization in the memory 60 of the references (e.g. sequence number) of the recordings played substantially in their entirety (to approximately 70–80 percent of their length) or, if these are very numerous in comparison to the total number of recordings carried on the medium, the references of those eliminated according to the criterion previously stated.

As a result, when said recording medium is later reinserted into the apparatus 10, the memory 60 ensures that those recordings selected according to the criterion are played, as being the favorite recordings of the user.

As can be seen, if the apparatus is switched off while the recording medium is played, or if playback is interrupted (for example ejection of the medium), the program ensures that the references of the recordings not yet played are kept in memory, so that the user can decide later whether to select them or not.

If control button 31 is not put into operation, the processor 50 concludes that the program according to the invention should not be implemented, and the recording medium inserted into the apparatus is then played in its entirety, i.e. without taking into account the selections made by the user.

Furthermore, the system is arranged so that double actuation of said button 31 (ON - OFF) while a recording medium is played in the "favorite recordings" mode, cancels the selections made previously by the user, enabling him to enter a new selection of favorite recordings for the medium concerned.

It is, of course, also possible to provide user codes, as existing in the Philips CD624 apparatus, so that each user can memorize his own favorite recordings for each medium.

It is clear from the above that the processor 50 can be programmed to monitor only one control button entitled "eliminate" instead of monitoring the different control buttons. In this case the program ensures that when this button is actuated, the reference of the recording being played is eliminated, and simultaneously that the read-out device is positioned at the beginning of the following recording, for example.

Accordingly, in prior systems it is necessary for a user to "dial in" a program of "favorite" recordings before the program will operate the first time. According to this invention, the machine automatically detects how a disk was played the first time and repeats as a "favorite" recording program the selections which were played to 70–80 percent of their full length. Thus the necessity to program the favorite recordings is eliminated.

While the invention has been described in some detail by way of illustration and example, it should be understood that the invention is susceptible to various modifications and alternative forms, and is not restricted to the specific embodiments set forth. It should be understood that these specific embodiments are not intended to limit the invention but, on the contrary, the intention is to cover all modifications, equivalents, and alternatives falling within the spirit and scope of the invention as defined in the claims.

What is claimed is:

1. A process for memorizing references of recordings carried on a medium placed in an operating position in a playback device,
   the playback device being provided with means for recognizing a medium, means for memorizing the references, and a control for operating the means for memorization,
   the process being active in play mode and automatically carrying out the following steps for each recording carried on a medium placed in the operating system:
   monitoring the continuity of reproduction,
   automatically identifying the reference of the recording if it is played in its entirety or if a predetermined proportion of it is played, and
   storing for the medium all references automatically identified.

2. A process according to claim 1, wherein the step of monitoring the continuity of reproduction is carried out by monitoring actuation of control means causing a recording, other than the one in course of being played, to be played.

3. A process according to claim 1, wherein the step of monitoring the continuity of reproduction is carried out by comparing duration of a predetermined portion which is played with total duration of a recording.

4. A process according to claim 1 including the further step, for each medium not recognized by the means for recognizing a medium, of temporarily selecting and memorizing the references of all the recordings carried on the medium, before carrying out the step of monitoring the continuity of reproduction for each recording.

5. A process according to claim 4, including the step of memorizing the references of the recordings on a medium which have not yet been played until they have been played.

6. A process according to claim 1 including the further step for a medium placed in the playback device in the operating position,
   cancelling memorizing of references previously registered in response to a control operation by a user.

7. An apparatus for memorizing references of recordings carried on a medium placed in an operating position in a playback device, said apparatus comprising:
   means for recognizing a medium;
   means for memorizing references identifying recording carried on a medium;
   a control for operating the means for memorization, the means for memorizing being active in play mode and automatically carried out for each recording carried on a medium placed in the operating position under control of a user;
   means for monitoring the continuity of reproduction of each recording carried on a medium as it is being played;
   means for automatically identifying the reference of a recording if it is played in its entirety or if a predetermined proportion of it is played; and
   means for storing for the medium all references automatically identified.

* * * * *